United States Patent [19]

Moret

[11] Patent Number: 4,803,034

[45] Date of Patent: Feb. 7, 1989

[54] CONCRETE FABRICATION AND CONCRETE SUCTIONING METHOD

[75] Inventor: Willem Moret, Sliedrecht, Netherlands

[73] Assignee: Machinefabriek de Remise B.V., Netherlands

[21] Appl. No.: 879,209

[22] Filed: Aug. 20, 1986

Related U.S. Application Data

[63] Continuation of Ser. No. 611,600, May 18, 1984, abandoned.

[30] Foreign Application Priority Data

May 19, 1983 [DE] Fed. Rep. of Germany ....... 8301789

[51] Int. Cl.[4] ........................ B28B 1/48; B28B 11/12; B28B 11/22; B65G 53/00

[52] U.S. Cl. ...................................... 264/504; 15/303; 15/320; 264/101; 264/138; 264/154; 264/163; 264/333; 264/570; 264/571; 406/151

[58] Field of Search ............... 264/504, 561, 138, 570, 264/571, 101, 140, 154, 161, 163, 333; 406/151, 152; 15/301, 303, 320, 340

[56] References Cited

U.S. PATENT DOCUMENTS

| | | | |
|---|---|---|---|
| 788,379 | 4/1905 | Rich | 264/504 |
| 3,571,839 | 3/1971 | Hartmann et al. | 15/303 |
| 3,867,498 | 2/1975 | Krouskop | 264/504 |
| 3,942,214 | 3/1976 | Maasberg | 15/340 |
| 3,985,848 | 10/1976 | Frische et al. | 264/504 |
| 3,990,748 | 11/1976 | Ghusn et al. | 406/152 |
| 4,023,233 | 5/1977 | Prestwich | 15/320 |
| 4,108,933 | 8/1978 | Göransson et al. | 264/504 |
| 4,242,299 | 12/1980 | Adams | 264/504 |
| 4,255,829 | 3/1981 | Tarasiuk | 15/303 |
| 4,496,515 | 1/1985 | Ptasenski et al. | 264/504 |

FOREIGN PATENT DOCUMENTS

| | | |
|---|---|---|
| 2031936 | 1/1972 | Fed. Rep. of Germany . |
| 2537004 | 3/1977 | Fed. Rep. of Germany . |
| 2847466 | 5/1980 | Fed. Rep. of Germany . |
| 8004977 | 4/1982 | Netherlands . |
| 1100266 | 1/1968 | United Kingdom . |

*Primary Examiner*—Jan H. Silbaugh
*Assistant Examiner*—Karen D. Kutach

[57] ABSTRACT

Producing a concrete object by first pouring an uncured mixture into a mold and then removing undesired uncured concrete using a suctioning apparatus having a liquid supply and a suction nozzle attached to a suction channel. The concrete mixture is loosened and diluted by liquid supplied through the liquid supply. This liquid and loosened diluted concrete are suctioned through the suction nozzle and the suction channel into a tank.

4 Claims, 10 Drawing Sheets

63
64
60
62
61

60
61
62

60
62
61

CONCRETE FABRICATION AND CONCRETE SUCTIONING METHOD

This is a continuation of application Ser. No. 611,600 filed May 18, 1984, now abandoned.

The invention relates to a machine and method for suctioning material, comprising a suction generator connected to a tank, which tank is also connected to a suction channel to the end of which a suction nozzle is attached.

Machines of this type are known as industrial vacuum cleaners, used for suctioning and collecting solid material as well as fluids.

These industrial vacuum cleaners however are not suited for suctioning a material such as concrete. Especially in the concrete processing industry however there has existed for years an increasing need for a machine designed for suctioning concrete, especially a machine by means of which surplus concrete material can be suctioned from a mould floor.

Until now it is usual, for instance within the scope of a so called "long bench" method or within the scope of other methods in which a mould floor is used for moulding concrete, that surplus concrete material, which is split alongside the actual mould, is removed after the moulding process by hand using hand tools or is broken off after the concrete is cured using mechanical tools. On the one hand this incorporates a very labor intensive step in the complete process and on the other hand the wear both to the work floor as well as to the tools is very high.

Furthermore in the so called "long bench" concrete moulding method it is often necessary to create excavations into the moulded concrete profile at certain predetermined locations. Until now, these excavations usually have been made with mechanical tools after initial curing of the concrete. Also the fabrication of these excavations however is very labor intensive and makes high demands upon the tools used.

An object of the invention is now to provide a machine by means of which it is possible to suction off surplus concrete material spilt alongside the actual concrete profile and a further object is to provide a machine by means of which it is in a very simple way possible to fabricate excavations within the non cured concrete profile.

In agreement with said object, the invention now provides a machine and a method for suctioning concrete material. The machine comprises a suction generator connected to a tank, which tank is also connected to a suction channel to the end of which a suction nozzle is attached, which machine is according to the invention characterized in that the material to be suctioned off consists of uncured concrete which by means of water is loosened and/or diluted and is suctioned together with said water through the suction nozzle and the suction channel into the tank. The pressure of the water supplied during the process of removing the surplus concrete from the work floor has to be sufficient to soften these surplus concrete and to decrease the adherence between said surplus concrete and the work floor as well as to decrease the coherence between the various components such that said surplus concrete can be suctioned off thereafter through the mentioned suction nozzle. Of course the suction pressure should be adjusted such that the material will be suctioned off effectively and will be accumulated into the tank without further transport of the material to the suction generator. Besides that, the supplied amount of water is preferably adjusted such that all the supplied water is suctioned off through the suction nozzle.

The method comprises producing a concrete object by first pouring an uncured concrete mixture into a mold and then removing undesired uncured concrete using the above-described machine, by loosening and diluting concrete with liquid supplied through the liquid supply means and suctioning this liquid and loosened diluted concrete through the suction nozzle and the suction channel.

In preferred embodiments of the method, the liquid is water. The apparatus is placed in position for forming an excavation in the concrete mixture. The nozzle is pressed against the concrete, and the concrete is suctioned through the nozzle to form the excavation. The nozzle is lowered into the excavation as it is formed.

A machine of this type can be used in a fixed configuration, for instance in a system in which moulds in a fixed position are filled with concrete whereafter the mould is removed and the moulded concrete profile is transported to another position for curing. The machine according to the invention may function within the moulding area to clean each time the mould, the surroundings, as well as the underground. Such a concrete suctioning machine is especially needed to that industrial field in which the so-called "long bench" concrete moulding method is applied for moulding long concrete profiles onto a work floor by means of a concrete moulding machine, whereby the dimensions of the long concrete profile at least in the sidewards direction are partly detemrined by a mould which is installed onto the work floor. During or after the curing of the concrete, said profile will be divided into sections of predetermined dimensions. The resulting concrete elements are used on a large scale in the building industry. Concrete molding machines according to the invention are supported on rails positioned on both sides of the molded concrete profile or they are positioned within the edge of the mold itself. It will be clear that both said rails as well as the direct environment of the moulded concrete profile, particularly the sides of the mould and the space between the mould and the rails, the so called facet, but also the remaining parts of the work floor have to be kept free of surplus concrete. Said surplus concrete can be the result of spilling during the actual moulding process, but also the result of the fabrication step in which excavations are made into the concrete profile.

An embodiment of the machine according to the invention is now characterized in that the machine comprises a frame provided with wheels, onto which frame the various parts of the machine are installed. Said wheels may for instance run on the same rails as are used for the concrete moulding machine. After the concrete moulding machine has done its job and is for instance transferred to the next bench, the machine according to the invention can do its job after a certain waiting period to assure a sufficient preliminary curing of the concrete. In case quick curing concrete or concrete cured by heating is used, however, the machine according to the invention will directly follow the concrete moulding machine.

Although the simplest embodiment of the machine comprises only one suction nozzle, connected through a suction channel to the tank, a preferred embodiment of the machine comprises a number of suction channels with corresponding suction nozzles, which suction channels are connected to the tank through a valve mechanism such that always only one of a predetermined combination of suction channels is operative. Therewith it is possible to apply for instance suction nozzles of different shape, dependent onto the location from which concrete has to be suctioned off. It is furthermore also possible to remove surplus concrete simultaneously or in a succeeding order and to remove surplus concrete from various positions using various suction nozzles without the necessity to move the suction nozzles themselves over relatively large distances.

Particularly for fabricating excavations in the uncured concrete profile, the machine according to the invention comprises a suction nozzle whereby the water conduit for supplying water terminates within said suction nozzle. Thereby the water only impinges onto that part of the concrete layer positioned directly within the opening of the suction nozzle so that, when the machine is operative, an excavation can be formed into the concrete layer, the diameter of which is equal to the diameter of the suction nozzle. As will be clear, by making a series of connecting excavations, it will be possible to realize excavations of any desired shape and dimensions.

Preferably the suction nozzle consists of a tubular element with predetermined sectional shape, open at the underside, which tubular element is at the upper side sealingly connected to the suction channel at a position at some distance of the end of the suction channel, whereby the water conduit terminates within the space between the suction channel and the upper part of the tubular element. The result thereof is the forming of a water jacket within the space between the suction tube and the upper part of the tubular element to prevent blockage of the water supply conduit by the suctioned concrete on the one hand, and to enhance suctioning of the concrete material with a fluid flow on the other hand. Said effect is even stronger if the water conduit leads to one or more jet nozzles or spraying nozzles installed within the space between the suction channel and the upper part of the tubular element.

As already remarked the machine according to the invention is particularly suited for use within the scope of a so called "long bench" concrete moulding method. In a preferred embodiment the machine therefore comprises at least one suction channel the suction nozzle of which is positioned closely above the work floor and closely alongside the concrete profile. Said suction nozzle is destined to remove surplus concrete which, after moulding the concrete profile but before curing thereof, are spilt onto the adjacent walking path or spilt onto the rails. Thereby for instance first of all the work floor at one side of the long bench can be cleaned whereafter during the return movement the work floor at the other side of the long bench can be cleaned. It is however preferred, that the machine comprises at both sides of the moulded concrete profile at least one suction nozzle positioned closely above the work floor and closely alongside the moulded concrete layer. In that case the machine may comprise two or more tanks whereby the suction channels of said suction nozzles are alone or in combination connected to one or more tanks. However, also the use of only one tank is possible.

Because said suction nozzles are destined to clear the work floor alongside the long bench and to clean the adjacent walking path it is preferred that one or more water-spraying elements are installed ahead of the suction nozzles in the direction suction nozzle movement. Said water spraying elements are preferably directed onto the walking path directly in front of the suction nozzle such that surplus concrete on the floor is diluted, are released from the work floor and will already be moved under the influence of the water pressure into the direction of the suction nozzle and will be suctioned off together with the water supplied through said suction nozzle.

Dependent on the size of the elements to be fabricated the width of the profile moulded in this "long bench" process will otherwise be equal and therefore it is preferred that said suction nozzles are able to move over at least part of the width of the work floor using guiding means. Irrespective of the varying width of the concrete profile now the suction nozzles can be directly adjusted to the ideal position alongside the concrete profile.

It is also possible to provide the suction nozzle opening with an elongated shape and to make at least part of the suction nozzle rotatable around an in general vertically extending axis of rotation. Therewith it is possible to adjust the position of the suction nozzle to the width of the path to be cleaned respectively the work floor to be cleaned. The maximum width is now determined by the length of said elongated suction nozzle opening and the minimum width is equal to the width of the suction nozzle opening.

To clean the sides of the mould of a moulded profile from eventually adhering material, the machine may comprise at least a water jet nozzle directed such, that the water jet is directed alongside the mould of the moulded concrete profile and impinges onto the work floor directly before or at the side of the corresponding suction nozzle. The result thereof is that the side wall of the mould will be cleaned by the water jet.

In many cases it will be necessary, depending on the specifications, to realize excavations into the moulded concrete profile. If the moulded concrete profile will be divided into segments which are for instance used for building houses, then these excavations are necessary for passing water conduits, electricity cables, heating system pipes etc. These excavations have to be made at predetermined positions. In this connection it is preferred that the machine comprises at least one suction channel with a suction nozzle of the type, whereby the water conduit for supplying water terminates within the tubular element of the suction nozzle. This type of suction nozzle was already indicated above. If a suction nozzle of this type is pressed against the moulded concrete profile at a predetermined position then inside the opening of the suction nozzle the freshly moulded concrete will be loosened under the influence of the supplied water and this loosened concrete will be suctioned off through the suction nozzle and will be transported to the tank. The effect thereof is that the suction nozzle will move downwards deeper and deeper into the concrete layer and forms therewith an excavation the dimensions of which correspond to the outer dimensions of the suction nozzle. The process can be stopped when the suction nozzle has reached a predetermined depth. Both blind passages as well as through going passages with predetermined dimensions in both length direction as well as width direction can be made in this way. It is also possible to realize excavations at the edges of the concrete profile.

Although it is very well possible to make said excavations under hand control whereby the suction nozzle is positioned by an operating person onto the concrete layer and is lowered until the required depth into the concrete layer, it is preferred that the suction nozzle with the corresponding suction channel is connected through guiding means to the frame such that the suction nozzle is able to move over the complete width of the moulded concrete profile and is furthermore able to move in vertical direction. Because of the presence of guiding means a more accurate and defined positioning of the suction head and therewith of the realized excavations is obtained.

Upto now it is usual practice to divide a moulded concrete profile after curing into sections by means of a concrete sawing mechanism. The necessity to use a sawing mechanism at least for the concrete will be eliminated in case the machine according to the invention comprises a suction nozzle of which the walls which are perpendicular to the length direction of the reinforcing elements into the concrete profile, are embodied with slits positioned and dimensioned such that the suction nozzle will be enabled to move downwards into the concrete profile without being held by said reinforcing elements until the suction nozzle at least approximately has reached the work floor. In that way it is possible to realize in one or more steps a complete intersection in width direction through the concrete profile without intersecting however the reinforcing elements. The reinforcing elements have to be cut through by means of a suitable sawing mechanism. Often it is not necessary to remove the concrete up to the work floor itself. The remaining layer of unreinforced concrete will easily and neatly break off when the segments are moved out of the mould.

According to a further development the machine comprises a control unit for controlling the guiding means such that the surplus concrete material can be removed from the work floor over a desired width at both sides of the moulded concrete profile whereas at the other hand by means of the thereto destined suction nozzle excavations of predetermined shape can be made into the moulded concrete profile at predetermined locations. Such a control unit may comprise a preprogrammed processor which controls both the movement of the complete frame along the long bench as well as the correct positioning and functioning of the suction nozzles. When the frame is moving the suction nozzles destined for cleaning the work floor alongside the moulded concrete profile will be operative. If an excavation has to be made then the frame will stop. The suction nozzles for cleaning the work floor will be switched off, the present valve mechanism will be moved into another position and the excavation suction nozzle will be positioned onto the right location and switched on. After making the excavation the used excavation suction nozzle is pulled upwards and brought to an initial position whereafter the frame moves further along the long bench with operative suction nozzles at both sides.

To prevent the suctioning of water and/or surplus concrete from the reservoir into the direction of the suction generator it is preferred that the input of each tank comprises a deflection unit and that the suctioned concrete and water will impinge against said deflection unit whereafter the suctioned surplus concrete material will fall into the tank. The effect thereof is that the input velocity of the water and of the concrete will be strongly decreased resulting into a separation between the air on the one hand and the water and surplus concrete on the other hand.

When a predetermined amount of water and surplus concrete is accumulated into the tank, then said material has to be removed therefrom so that the machine can be used for further cleaning operations. Therefore it is preferred that the tank is embodied as a removable unit which through fast coupling elements is connected to the suction conduits respectively to the suction generator. By decoupling the various coupling elements it is now possible, for instance using an elevator mechanism which in general will be present anyhow, to lift the tank out of the machine and move said tank to a suitable place for emptying. It is preferred thereby that the tank is embodied as a tumble tank or dump tank, facilitating thereby the emptying of the tank.

The invention will now be discussed in more detail with reference to the attached drawings.

Figure 1:
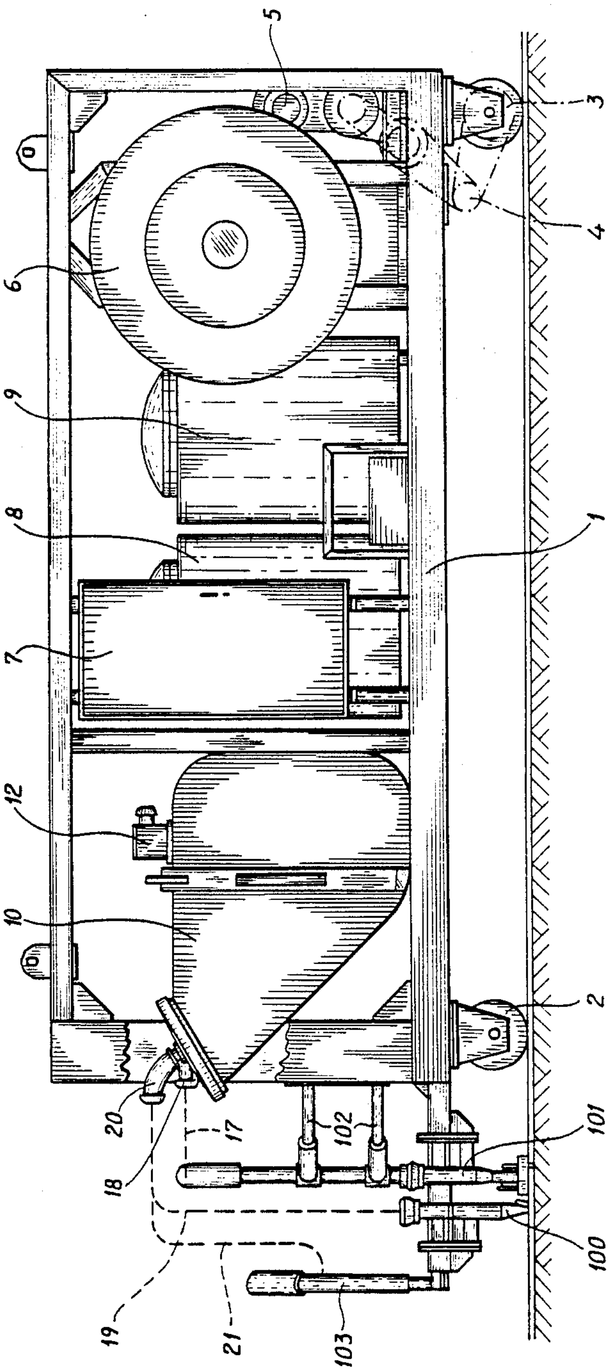
FIG. 1 shows a side view of one embodiment of the machine.
Figure 2:
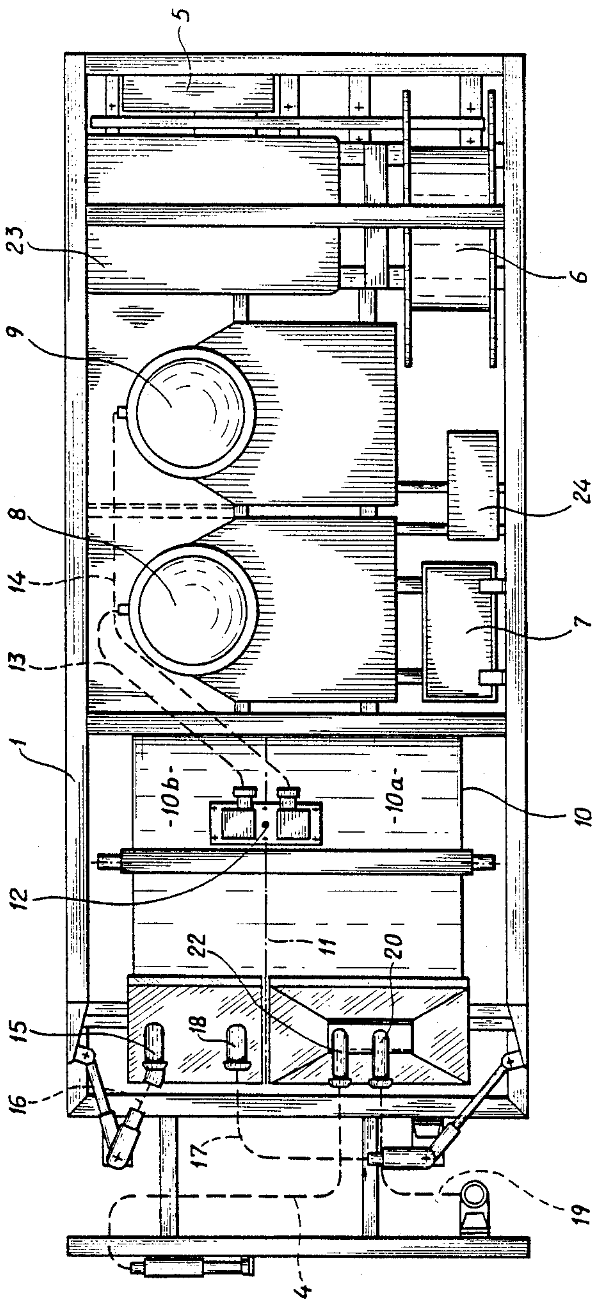
FIG. 2 shows a top view of this embodiment.
Figure 3A:
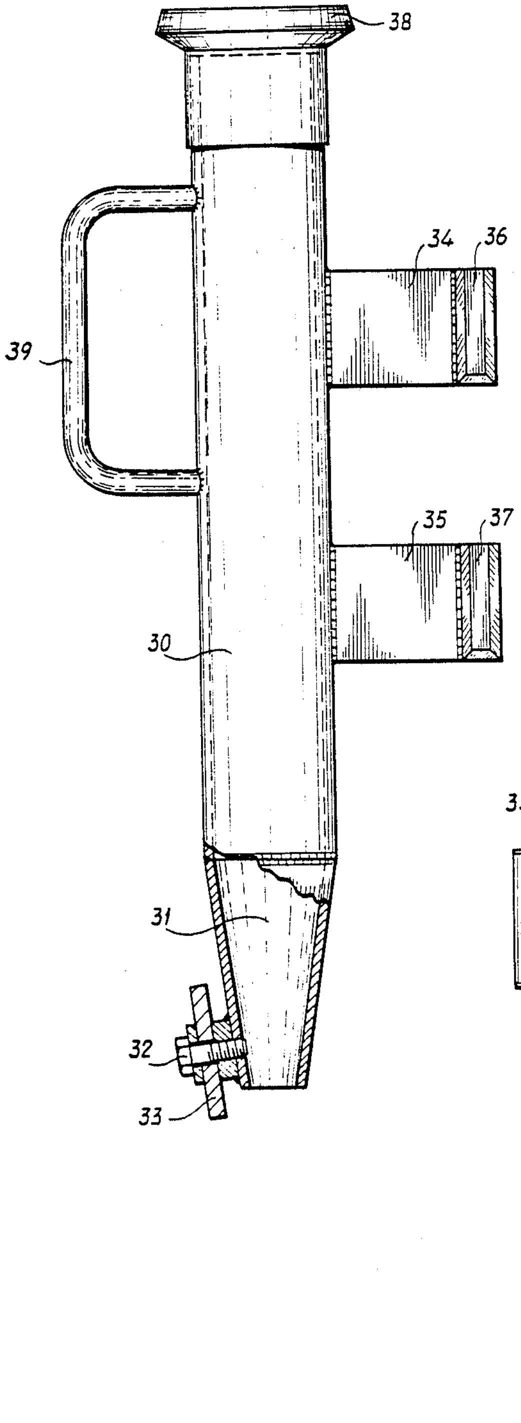
FIGS. 3*a* and 3*b* show in more detail an embodiment of part of the path of a suction unit.
Figure 3B:
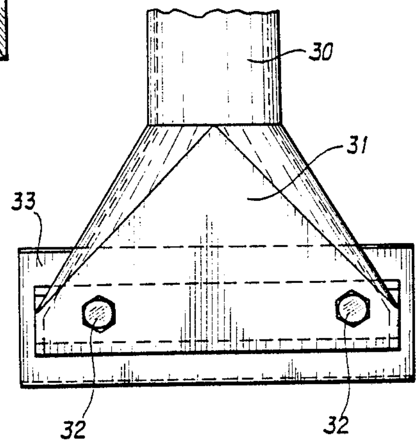

FIG. 1 illustrates a side view of an embodiment of the machine according to the invention and FIG. 2 illustrates a top view of this embodiment. In said figures the frame is indicated by 1. Said frame is mounted at the inner side onto four wheels of which two are visible in the figure, respectively the wheels 2 and 3 at the front side respectively the rear side of the machine. The rear wheels 3, or at least one of said rear wheels, is driven by a motor 5 by means of a transmission unit, which in general is indicated by 4 and is for instance embodied as a chain transmission.

Onto the frame a cable reel 6 is installed destined to pay out an electrical power supply cable during operation, which cable is connected to the electrical mains circuit. The other terminal of said power supply cable is connected to the electrical switch board 7 from which connections are running to the various electrically powered units of the machine, such as for instance the drive motor 5.

Onto the frame furthermore two suction generators 8 and 9 are installed, for instance embodied as commercially available vacuum cleaners or industrial cleaning apparatusses.

Furthermore a tumble tank or dump tank 10 is installed onto the frame 1, which tank is, by means of a dividing wall illustrated schematically by 11 in FIG. 2, divided into two inner hollow spaces 10*a* and 10*b*. At the top side of the tumble tank a connection block 12 is attached from where conduits are running to the suction generators 8 and 9. In this embodiment the space 10*b* is through the schematically illustrated conduit 13, connected to the suction generator 8 and the space 10*a* is through the schematically indicated conduit 14 connected to the suction generator 9. At the front side of the tumble tank a further number of pipe connections is installed destined to connect a number of suction channels leading to suction nozzles. These suction channels are at least partly embodied as flexible conduits between the respective suction nozzle and the respective connection pipe of the tumble tank 10.

At both sides of the machine there is a facet suction unit comprising a facet suction nozzle, which through a suction channel is connected to the section **10*b* of the tumble tank 10. In FIG. 2 the facet suction unit illustrated in the upper part is through the partly flexible conduit 16 connected to the pipe connection 15 and the facet suction unit illustrated in the lower part of the figure is through the flexible conduit 17 connected to the pipe connection 18**. The facet suction unit is destined to be used within a so called long bench concrete moulding method for cleaning the side walls of the mould of the moulded concrete layer as well as the adjacent part of the work floor.

The machine furthermore comprises a path suction unit destined to clean the path between the parallel long benches. Said path suction unit is in the figure connected to the pipe connection 20 through the at least partly flexible conduit 19.

Furthermore the machine comprises a separate excavation suction unit which through the at least partly flexible conduit 21 is connected to the pipe connection 22. Details of the suction units as well as the connections between the suction units and the tumble tank will be discussed in the following description.

The machine furthermore comprises a water tank 23 as well as a water pressure pump 24. Through said pump 24 water is delivered under pressure from the tank 23 to the suction nozzles in a way as will be described in more detail.

FIGS. **3*a* and 3*b* illustrates in more detail an embodiment of at least a part of the path suction unit. Said path suction unit comprises an in general vertical tube 30, which at the lower side comprises a path suction nozzle 31 consisting of a reducing element, welded to the tube 30, of which reducing element the cross sectional shape at the upper side corresponds to the cross sectional shape of the tube 30 whereas the suction nozzle 31 has at the lower side an elongated opening. The back side of the suction nozzle, seen into the direction of movement, carries a sealing flap, attached by means of a number of bolts or screws 32**, which flap preferably is made of a somewhat flexible and wear resistant material. During the movement of the suction nozzle above the surface to be cleaned said sealing flap will close the suction opening of the suction nozzle at the back side in relation to the underground with the result that the cleaning and suctioning operation of the suction nozzle will be enhanced.

The tube 30, comprises two support elements 34 and 35 to the ends of which the bended fixing places 36 and 37 are connected. Through said plates the tube 30 can be attached to the frame 1 of the machine in a way, not illustrated in detail. At the top side of the tube 30 a connecting section 31 is attached by means at which the flexible part of the suction conduit between the tumble tank 10 and the tube 30 can be connected.

To facilitate the dispositioning of the suction unit a hand grip 39 is attached to the tube 30.

Figure 4A:
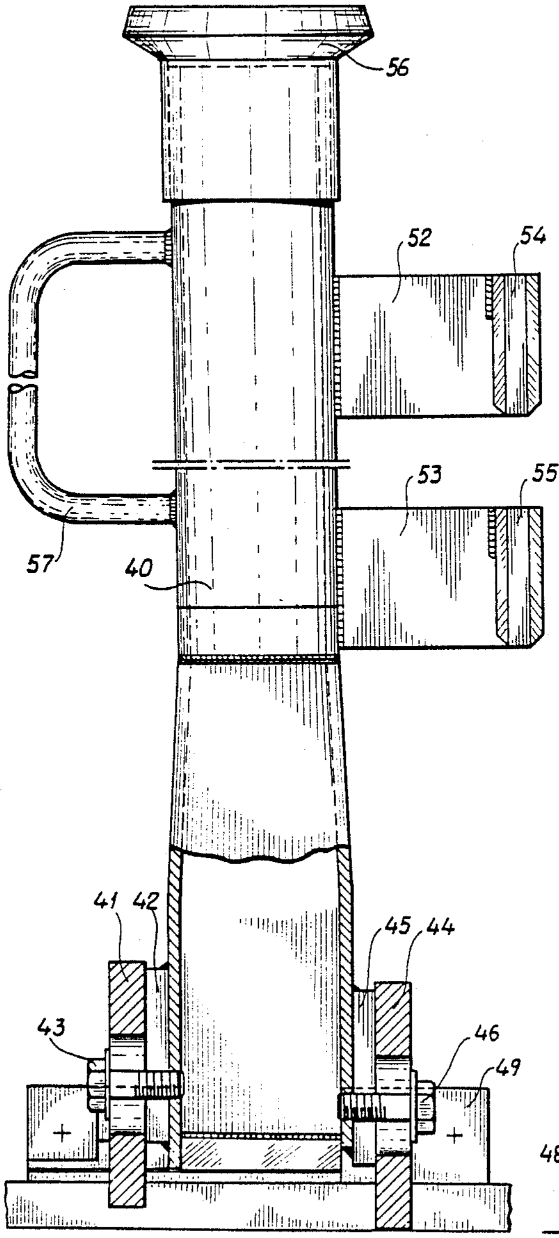
FIGS. 4*a* and 4*b* show the lower part of a facet suction unit.

In the FIGS. **4*a* and 4*b* the lower part of a facet suction unit is shown. Said unit comprises a tube 40 of which the upper side has in general a round cross section and of which the lower side has a more rectangular form whereby the center part functions as reducing section. The lower part of the tube 40 functions as suction nozzle and in principle this section is determined by a number of strips connected to the tube 40. In FIG. 4*a* the strip 41 is connected to the left side of the tube 40 which strip is kept at a predetermined distance of the tube 40 by means of the distance elements 42 and 45 connected by one or more bolts 43 such that the lower edge of the strip 41** is maintained at a predetermined height above the underground.

At the right side in FIG. **4*a* a strip 44 is present which is kept at a distance of the tube 40 by means of the distance elements 42 and 45 connected by means of one or more bolts 46. Also the lower edge of the strip 44 is positioned at a predetermined height in relation to the underground to be cleaned. In this embodiment the strip 44** will be dragged almost directly over the underground. Adding a wear resistant dragging strip results into an improved cleaning effect.

Figure 4B:
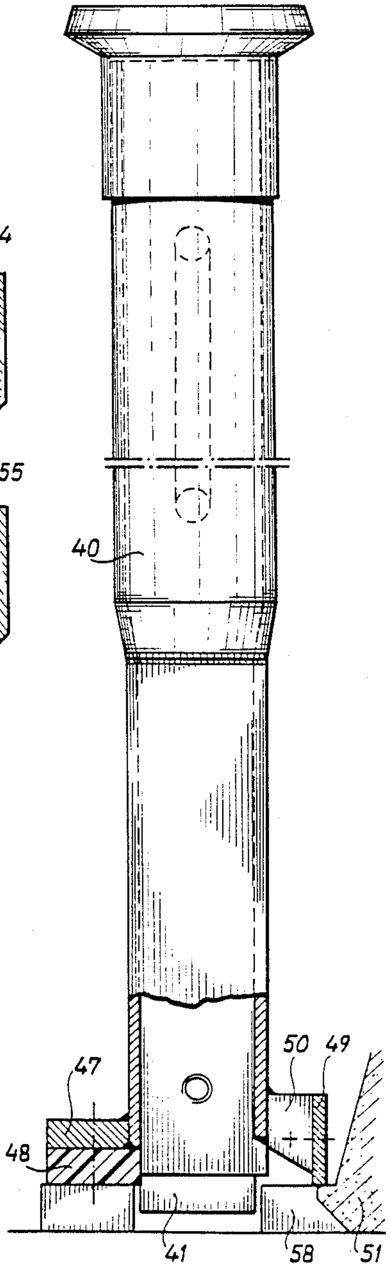
Figures 5A, 5B, 5C:
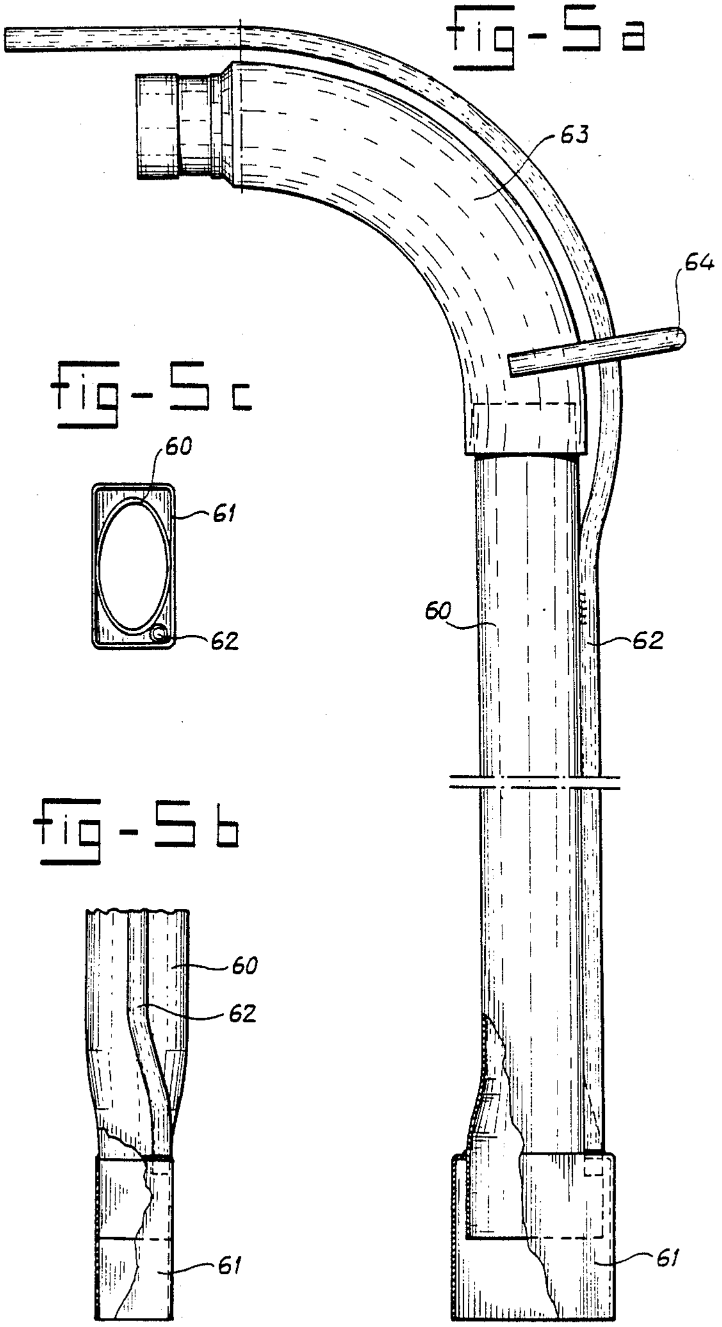
FIGS. 5*a*, 5*b* and 5*c* show details of an excavation suction unit.

In FIG. **4*a* at the front side therefore not visible in the figure, however visible in FIG. 4*b* at the left side, the closing element 48 is connected to the tube 40 by means of the welded supporting element 47. Said closing element 47** is preferably made of a somewhat flexible and/or wear resistant material.

Furthermore at the back side in FIG. **4*a* respectivly the right side in FIG. 4*b* the strip 49 is connected to the distance support elements 50**.

In FIG. **4*b* furthermore the side wall of the moulded concrete profile 51 and the mould 58 are visible. The facet suction unit is guided directly along the side wall of said mould and takes care that the side wall will be cleaned from surplus concrete. In the shown embodiment part of the facet suction unit furthermore runs over the top side of the mould 58** which in this case is free, such that also said top side will be cleaned. A water sprayer may be present, not illustrated in the figure, to spray water directly in front of the facet suction unit onto the top side and/or onto the side wall of the mould.

Also said facet suction unit comprises a number of supporting elements 52 and 53, each at their ends comprising a thin plate 54 respectively 55 to attach the facet suction unit in a not further illustrated way to the frame 1. At the top side of the tube 40 a pipe connection 56 is realized by means of which the tube 40 may be connected to the flexible part of the suction conduit, of which the other end is coupled to the tumble tank 10. For ease of handling furthermore a hand grip 57 is present.

The FIGS. **5*a*, 5*b* and 5*c* illustrate details of an excavation suction unit. Said excavation suction unit comprises a tube 60 having in general a circular cross section, whereas the lower part of the tube 60 in this embodiment is somewhat flattened such that the cross section is almost elliptical. The lower part of the tube 60 is inserted into the rectangular tubular element 61 such that said tubular element 61 is closed at the upper side against the conduit 60. Within said tubular element 61 and the upper end thereof a free space is created between the lower end of the conduit 60 and the tubular element 61. A water pipe 62 extends alongside the conduit 60 and runs through the upper side of the tubular element 61 within said tubular element 61 and terminates above the lower edge of the conduit 60. The result thereof is that in said space between the lower part of the conduit 60 and the tubular element 61 a water jacket is created which on the one hand has a kind of cutting action onto the concrete layer into which an excavation should be made, whereas on the other hand the suctioning of material will be enhanced thereby. In this embodiment the conduit 60 is at the upper side coupled to a bend section 63 to which a hand grip is attached. The other end of the bend section 63 is through a flexible conduit section coupled to the input of the tumbling tank 10. However, it will be clear that the tube 60 may be connected also in another way to the input of the tumbling tank 10**.

Figure 6:
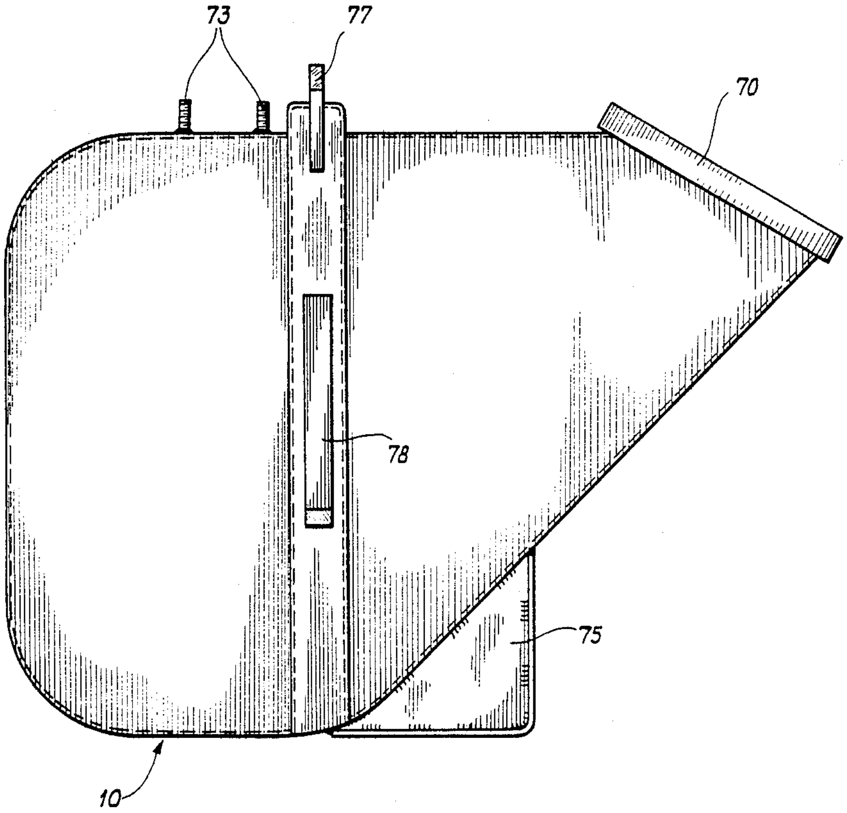
FIGS. 6 and 7 show details of an embodiment of a tumbling tank.
Figure 7:
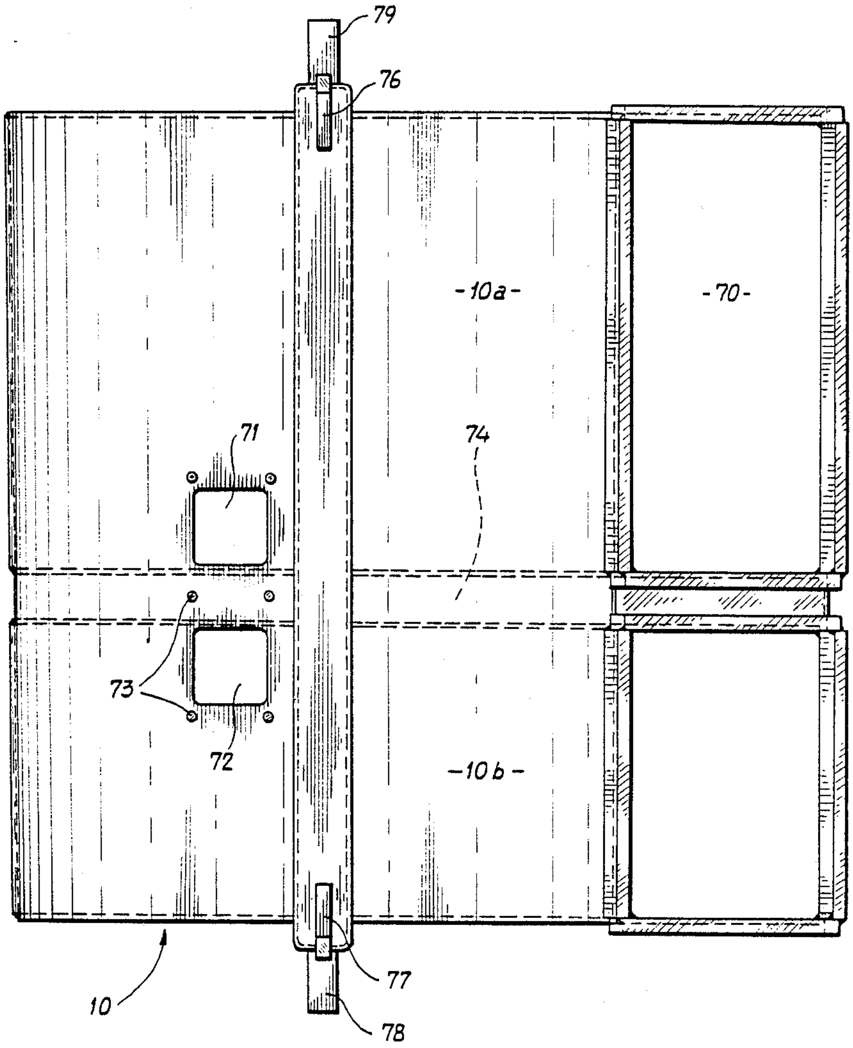

The FIGS. 6 and 7 illustrate more details of an embodiment of the tumbling tank 10. As appears from these figures the tumbling tank is embodied as a kind of hopper shaped receiving tank of which the input section comprises an opening 70 provided into a flat surface, onto which opening a lid with connecting pipe(s) can be mounted in a way to be described in more detail. Furthermore said coupling tank comprises the openings 71 and 72 to which by means of moulded pipe connections 73 the connections to the suction generators can be installed. As appears specially from FIG. 7 the inside of the tumbling tank 10 is by means of a combined separating wall 74 divided into two compartments 10*a* and 10*b*. One or more supporting elements 75 are attached to the slanting lower outside surface in such a way that the tumble tank 10 can be positioned onto an underground in a stable way. Furthermore a number of supporting girders are welded to the upper wall and the side walls in the way illustrated in the figures, which girders have hoist elements 76 and 77 as well as tumbling support elements 78 and 79 by means of which the tumbling tank 10, positioned onto a suited tumbling base may be tumbled such that the contents of the tank may be removed through the input opening 70 after removing of the thereon fitted lids.

Figure 8:
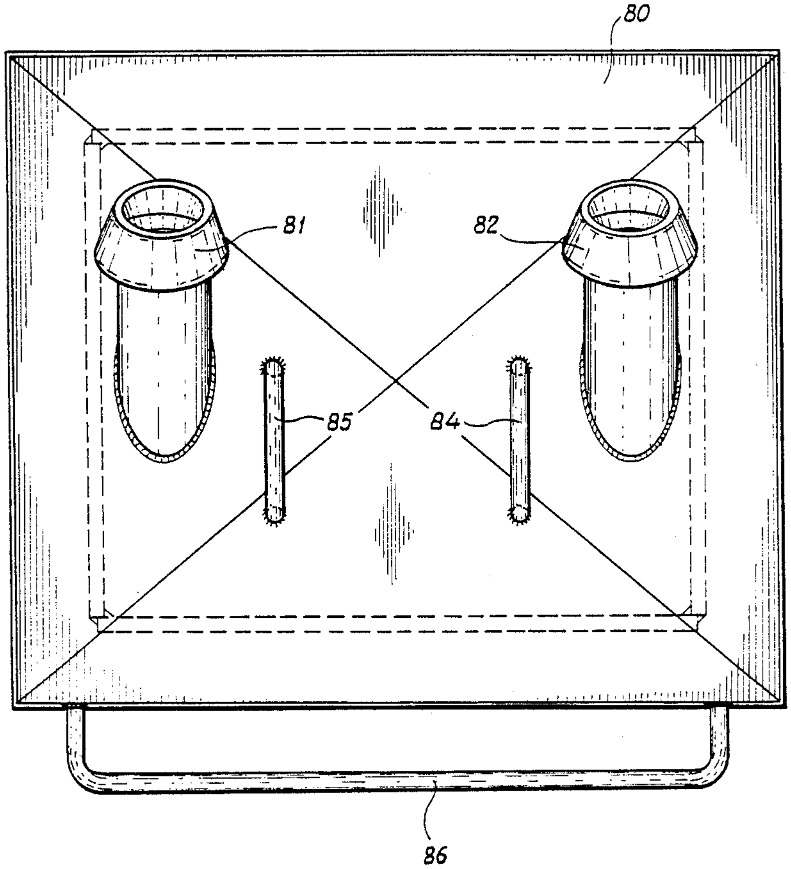
FIGS. 8, 9 and 10 show details of a lid for an input opening of a tumbling tank.
Figure 9:
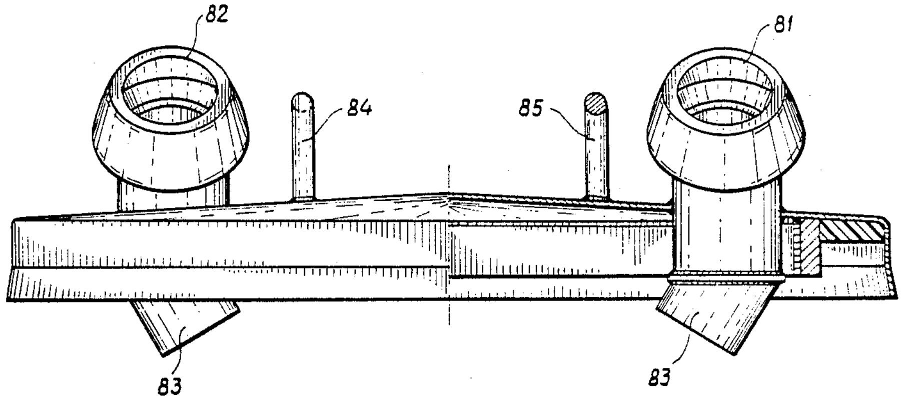
Figure 10:
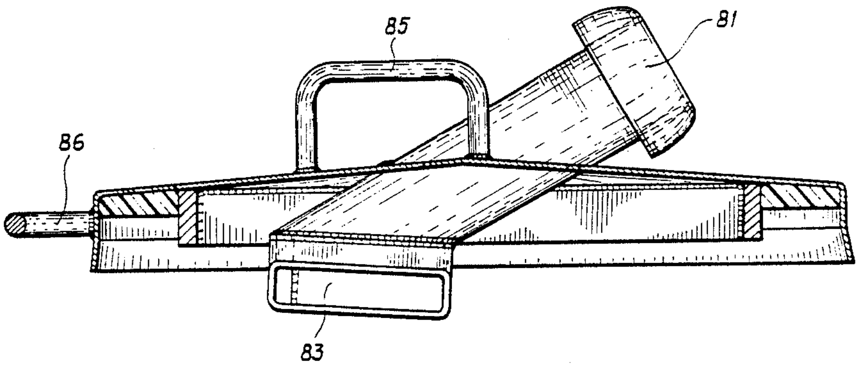

The FIGS. 8, 9 and 10 show more details of a lid which can be positioned onto the input opening of the section 10*b* of the tumble tank 10 and which is destined for connecting the path suction units. Said lid 80 comprises at the upper side slanted forwards extending connecting pipes 81 and 82 which tubular connecting pipes at the under side of the lid, i.e. in the operative situation of the lid at the inside of the tumble tank 10 comprise a bended section with varying cross sectional shape. This bended section is in FIGS. 9 and 10 indicated by 83. Because of said bended section 83 the incoming flow of material, by means of the incoming water and surplus concrete is first of all bended to another flow direction and thereby slowed down and further directed to the lowest position into the tumbling tank 10 so that now the impinging action will take place at a very low level inside the tumbling tank 10 and therefore the suctioned off material will almost completely lose its velocity so that there is no danger that the suctioned material together with the suctioned air will be drawn into the direction of the suction unit 8.

The lid furthermore comprises a number of hand grips 84, 85 and 86 to enhance the handling of the lid.

Figure 11A:
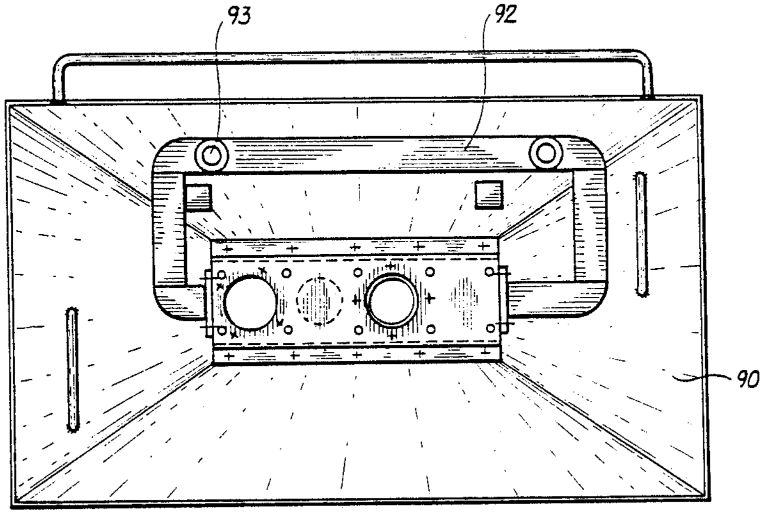
FIGS. 11*a*, 11*b*, and 11*c* show details of another lid positioned onto an inlet opening of a tumbling tank.
Figure 11B:
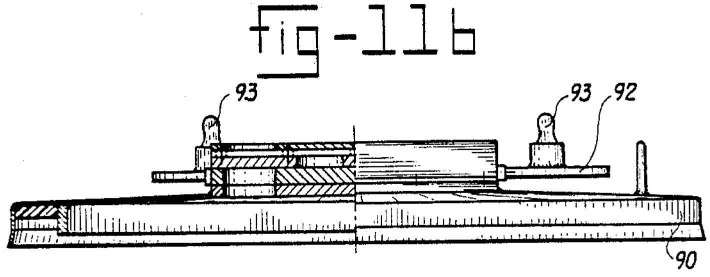
Figure 11C:
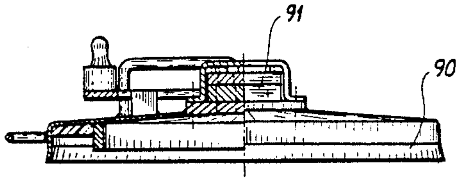

The FIGS. 11*a*, 11*b* and 11*c* illustrate a number of details of the lid 90 which is positioned onto the inlet opening of the compartment 10*a* of the tumbling tank 10 which lid comprises as is illustrated in FIG. 2 a number of connecting pipes 20 and 22. Said connecting pipes are in FIGS. 11*a*, 11*b*, and 11*c* deleted for the sake of clearness. The lid 90 comprises a shifting mechanism with a shifting element 91 which can be moved by means of an operating handle 92 onto which some knobs 93 are placed. By shifting the element 92 either the inlet pipe connection 20 is opened to the inside of the tumbling tank 10 or the pipe connection 22 is opened to the inside of the tumbling tank 10. By operating the shifting element 91 by means of the handling grip 92 one of the suction units connected to said pipe connections can be switched off.

As appears from FIG. 1 the path suction units, of which the path suction unit 100 is visible in FIG. 1, are mounted in fixed positions to the frame based on the supposition that the illustrated embodiment of the machine is destined for use in a long bench concrete moulding process, whereby the path between the moulded profiles has a predetermined known width.

The facet suction nozzles, of which the facet suction nozzle 101 is visible in FIG. 1 have to be moved more or less inwards, dependent onto the specifications of the moulded concrete profile, and therefore at least the lower part of the facet suction nozzle 101 is through supporting element connected to a guiding rail such that the position of the suction opening of the suction nozzles can be adjusted. Said adjustment can be obtained through a supporting mechanism which in FIG. 1 in general is indicated by 102. It will be clear to the expert in this field, that various guiding mechanisms are conceivable within the scope of the invention.

In FIG. 1 furthermore an excavation suction unit 103 is indicated as a detachable suction unit which, in case the unit is not used, can be hooked onto a thereto destined support on the frame. The excavation suction unit of this embodiment is hand operated, that means it is moved by hand to the correct position and maintained at that position until an excavation of the desired depth is obtained.

However, it will be clear that the excavation suction unit 103 can be guided by means of specially destined guiding means along the front side of the carriage, for instance using a rail by means of which the excavation suction unit can move across the complete width of the long bench profile and further guiding means to move the excavation suction unit upwards and downwards.

If these guiding means are controllable, in other words if the position of the excavation suction unit is remotely controllable, then it is possible to use a programmable unit to realize excavations into the moulding concrete profile at predetermined bases without further human intervenience, which programmable unit can furthermore switch the drive motor 5 of the frame on and off at the current point of time.

During operation, the machine will move slowly over the moulded concrete profile, whereby the path at both sides of the moulded profile will be cleaned by the path suction nozzles and the direct environment of the side walls of the concrete profile will be cleaned using the facet suction nozzles. Furthermore either by hand or under program control the drive motor of the frame will stop at predetermined positions and by means of the excavation suction unit 103 an excavation of predetermined shape can be made. In case the excavation suction unit 103 is used the shift element into the lid on the tumbling tank has to be brought into the correct position such that the facet suction unit will be switched off. When the excavation is ready the shift element into said lid is brought back to the earlier position such that the facet suction unit will be switched active again and the drive unit is switched on to move the machine further.

At the end of the moulded concrete profile the lids of the tumbling tank 10 are removed and the connections to the suction units 8 and 9 are decoupled whereafter the tumbling tank 10 by means of an hoisting mechanism can be lifted out of the machine and can be placed onto a tumbling basis to pour out the contents of the tumbling tank at a predetermined place.

Although the invention is described in detail with reference to a specific embodiment thereof it will be clear that there are various changes and modifications possible within the scope of the invention. It will for instance be possible to equip the machine with a separate suction nozzle destined to process the end sections at the front and the rear end of the moulded concrete profile into a desired shape. Such a suction nozzle is preferably movable across the complete width of the profile. It is furthermore remarked that the number of suction nozzles, the number of compartments into the tumbling tank, the number of tumbling tanks and the number of suction generators may be varied according to the need within the scope of the invention.

It is furthermore remarked that not all details of the figures are indicated by name because it is supposed that the figures themselves are provided with sufficient information also of the not specifically described details.

I claim:

1. A method of producing a concrete object comprising:

(a) first pouring an uncured concrete mixture into a mold; and (b) then removing undesired uncured concrete by, (1) providing a suctioning apparatus having a liquid supply means, a suction nozzle attached to a suction channel, and a tank connected to said channel, (2) loosening and diluting concrete by means of liquid supplied through said liquid supply means, and (3) suctioning said liquid and said loosened and diluted concrete together, through said suction nozzle, through said suction channel and into said tank, thereby removing said liquid and said loosened and diluted concrete.

2. The method of claim 1 wherein said liquid is water.

3. The method of claim 1 comprising: positioning said suctioning apparatus in position for forming an excavation in said concrete mixture; pressing said suction nozzle against said concrete; and suctioning said concrete through said nozzle to form said excavation.

4. The method of claim 3 wherein said nozzle is lowered into said excavation as said concrete is suctioned away, to form a passage in said concrete object.

* * * * *